United States Patent
Chang et al.

(10) Patent No.: US 7,858,194 B2
(45) Date of Patent: *Dec. 28, 2010

(54) EXTREME LOW RESISTIVITY LIGHT ATTENUATION ANTI-REFLECTION COATING STRUCTURE IN ORDER TO INCREASE TRANSMITTANCE OF BLUE LIGHT AND METHOD FOR MANUFACTURING THE SAME

(75) Inventors: Cheng-Chieh Chang, Taipei (TW); Hsiu-Feng Liu, Jhongli (TW); Pi-Jui Kuo, Jhubei (TW)

(73) Assignee: Innovation & Infinity Global Corp., Hsinchu (TW)

( * ) Notice: Subject to any disclaimer, the term of this patent is extended or adjusted under 35 U.S.C. 154(b) by 294 days.

This patent is subject to a terminal disclaimer.

(21) Appl. No.: 12/153,829

(22) Filed: May 27, 2008

(65) Prior Publication Data
US 2009/0297877 A1    Dec. 3, 2009

(51) Int. Cl.
*B32B 7/00* (2006.01)
*B32B 15/00* (2006.01)
*B05D 1/36* (2006.01)
*B05D 5/00* (2006.01)

(52) U.S. Cl. ............... 428/432; 428/216; 428/336; 428/472; 428/702; 428/688; 428/689; 428/697; 428/699; 428/701; 427/419.3; 427/125; 427/126.3; 427/162; 427/165; 427/404

(58) Field of Classification Search .................... None
See application file for complete search history.

(56) References Cited

U.S. PATENT DOCUMENTS 6,045,896 A * 4/2000 Boire et al. ............ 428/432

\* cited by examiner

*Primary Examiner*—Ling Xu
(74) *Attorney, Agent, or Firm*—Rosenberg, Klein & Lee

(57) ABSTRACT

An extreme low resistivity light attenuation anti-reflection coating structure in order to increase transmittance of blue light, includes a substrate and a coating module. The coating module is formed on a front surface of the substrate and composed of a plurality of silicon carbide compound coating layers, a plurality of Al-based oxide coating layers and a plurality of metal coating layers that are alternately stacked onto each other.

18 Claims, 6 Drawing Sheets

EXTREME LOW RESISTIVITY LIGHT ATTENUATION ANTI-REFLECTION COATING STRUCTURE IN ORDER TO INCREASE TRANSMITTANCE OF BLUE LIGHT AND METHOD FOR MANUFACTURING THE SAME

BACKGROUND OF THE INVENTION

1. Field of the Invention

The present invention relates to a coating structure and a method for manufacturing the same, and particularly relates to an extreme low resistivity light attenuation anti-reflection coating structure in order to increase transmittance of blue light and a method for manufacturing the same.

2. Description of the Related Art

It is well known that the conventional layer structure for an anti-reflection optical coating has a general principle. This general principle is that the surface layer of the optical coating should be a material that scores low on the refractive index such as $SiO_2$, scoring 1.46 on the refractive index, or $MgF_2$, scoring 1.38 on the refractive index. However, when we apply the metal base anti-reflection coating on a display screen to create a high EMI shielding effect for a computer monitor, or low reflection glass for an LCD or a PDP, there are some bottlenecks in the process for high volume mass production. The basic reason for this is that the protective layer for example $SiO_2$ or $MgF_2$ of the optical layer structure is nature porous in microstructure and allow the $H_2O$ vapor diffuse into the inside low resistivity metal thin layer to change the electric and optical characteristic of the layer system.

On the other hand, in the general design rule for an anti-reflection coating, the first layer deposited on the substrate surface is a material with a high score on the refractive index (hereafter referred to as H), which is then followed by a second layer that is a material with a low score on the refractive index (hereafter referred to as L). The basic design rule for the conventional anti-reflection coating is that there is a layer structure such as HLHL or HLHLHL. In a simple case, if the materials of H are ITO and the materials of L are $SiO_2$, the 4-layered structure is glass/ITO/$SiO_2$/ITO/$SiO_2$. Because ITO is a transparent conductive material, the multi-layer coating of this layer structure has electrical conductivity of less than 100 Ωm, and can be used as an EMI shielding and/or electric static discharge when the conductive coating layer is bonded to the ground. However, when the electronic circuit moves to more fast speed and more powerful function. A significant request for extreme low resistivity, namely ≦0.6 Ωm, were ask for provide better function in EMI (Electronic magnetic Interference) shielding. Conventional multi-layer ITO coating have good performance in resistivity range of several Ωm. However, below 1.0 Ωm will largely increase the difficulty of mass production and result in a very high cost in final application.

On the other hand, although thin metal layer has good conductivity in electrical characteristic, but the metal also has many limitations in the application to form a multi optical layer system.

A well know phenomenon of thin film metal layer is the durability of thin metal layer. Once water vapor diffuse into the surface and contact with the thin metal layer, a oxidation process will occur spontaneously and finally change the chemical property of thin metal layer and significantly change the electrical and optical characteristic of the optical layer system. A design of special compound layer was used as a surface protect layer for this invention. This surface protective layer were compose of Titanium oxide, Silicon dioxide and Aluminum oxide. The protective layer is an effective diffusion barrier to prevent the water vapor diffuse from the surface into inner metal layer.

FIG. 1A shows a property diagram showing the relationship between the transmittance of light passing through a crude glass and the light wavelength according to the prior art. When light passes through a crude glass that has no any coating formed on its surface, the transmittances of different wavelength are the same about 92%.

FIG. 1B shows a property diagram showing the relationship between the transmittance of light passing through a processed glass and the light wavelength according to the prior art. When light passes through a processed glass that has an anti-EMI (Electromagnetic Interference) coating formed on its surface, the transmittances of different wavelength are different. In particular, the transmittance of the wavelength close to blue (left-most area) and the transmittance of the wavelength close to red (right-most area) are reduced to about 10%.

SUMMARY OF THE INVENTION

One particular aspect of the present invention is to provide an extreme low resistivity light attenuation anti-reflection coating structure in order to increase transmittance of blue light. The process of manufacturing the extreme low resistivity light attenuation anti-reflection coating structure in high volume production is highly reliable and has been routinely used in industries such as semiconductor manufacturing, disc head manufacturing, LCD manufacturing, CRT manufacturing, architecture glass manufacturing, touch sensor display manufacturing, screen filter manufacturing and plastic web coating for more than twenty years.

The material of the surface layer of the extreme low resistivity light attenuation anti-reflection coating is a high refractive index protective layer. The reflectivity of the extreme low resistivity light attenuation anti-reflection coating is below 0.5%. The resistivity of the anti-reflection coating is as low as 0.5 Ωm to 0.7 Ωm, and its transparency is between 40% and 65%.

The layer system of the present invention is also highly conductive for EMI (Electromagnetic Interference) shielding, has low reflectivity for optical viewing, is highly scratch resistance for surface hardness, and has moderate light attenuation effects for manufacturing PDP displays. For instance, the layer system has a resistance of between 0.5 Ωm and 0.7 Ωm and is hard enough to pass the scratch test of military standard MIL-C-48497.

After a coating module is formed on a substrate, a shutter is arranged on a top surface of the coating module. The shutter has a size smaller than that of the coating module in order to expose a surrounding area of the top surface of the coating module. Afterward a conductive layer is coated on the surrounding area of the top surface of the coating module in order to connect to the ground and achieve good electrical contact. Finally, the shutter is removed. In addition, the conductive layer can be a silver paste.

Moreover, because the present invention uses many Al-based oxide coating layers, the extreme low resistivity light attenuation anti-reflection coating structure can generate projecting light beams close to blue.

In order to achieve the above-mentioned aspects, the present invention provides an extreme low resistivity light attenuation anti-reflection coating structure in order to increase transmittance of blue light. The coating structure includes a substrate and a coating module. The coating module is formed on a front surface of the substrate and composed of a plurality of silicon carbide compound coating layers, a plurality of Al-based oxide coating layers and a plurality of metal coating layers that are alternately stacked onto each other.

In order to achieve the above-mentioned aspects, the present invention provides a method for manufacturing an extreme low resistivity light attenuation anti-reflection coating structure in order to increase transmittance of blue light. The method includes providing a substrate; and then forming a coating module on a front surface of the substrate. The coating module is composed of a plurality of silicon carbide compound coating layers, a plurality of Al-based oxide coating layers and a plurality of metal coating layers that are alternately stacked onto each other.

Because the surface layer has good protective properties, the surface layer act as a diffusion barrier totally prevent the water vapor diffuse into the inner metal layer and keep high reliability in environmental of the whole application. The present invention provides an extreme low resistivity shielding of an anti-reflection coating that can be applied to the LCD and PDP display industries for glass and plastic film substrates.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which.

DETAILED DESCRIPTION OF THE PREFERRED EMBODIMENTS

Figure 1A:
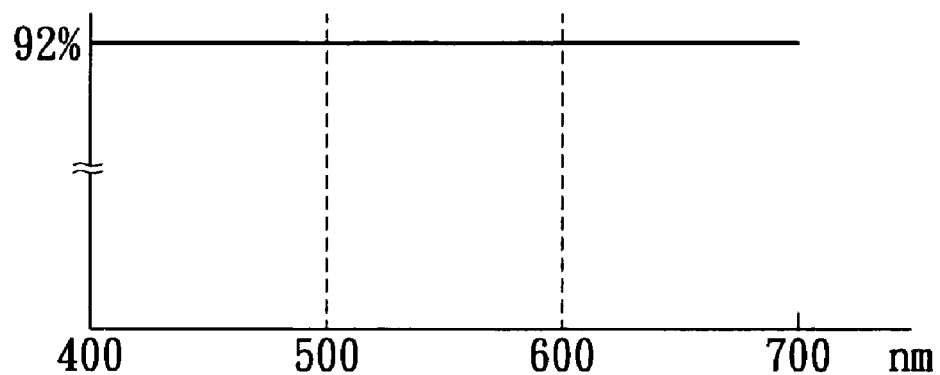
FIG. 1A is a property diagram showing the relationship between the transmittance of light passing through a crude glass and the light wavelength according to the prior art.
Figure 1B:
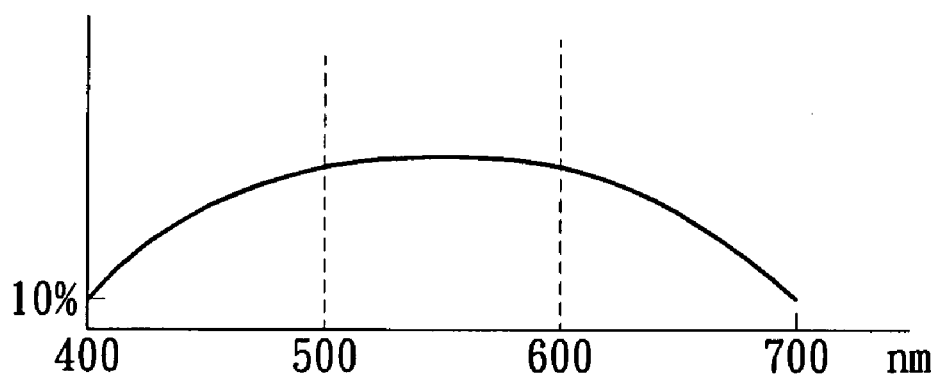
FIG. 1B is a property diagram showing the relationship between the transmittance of light passing through a processed glass and the light wavelength according to the prior art.
Figure 2:
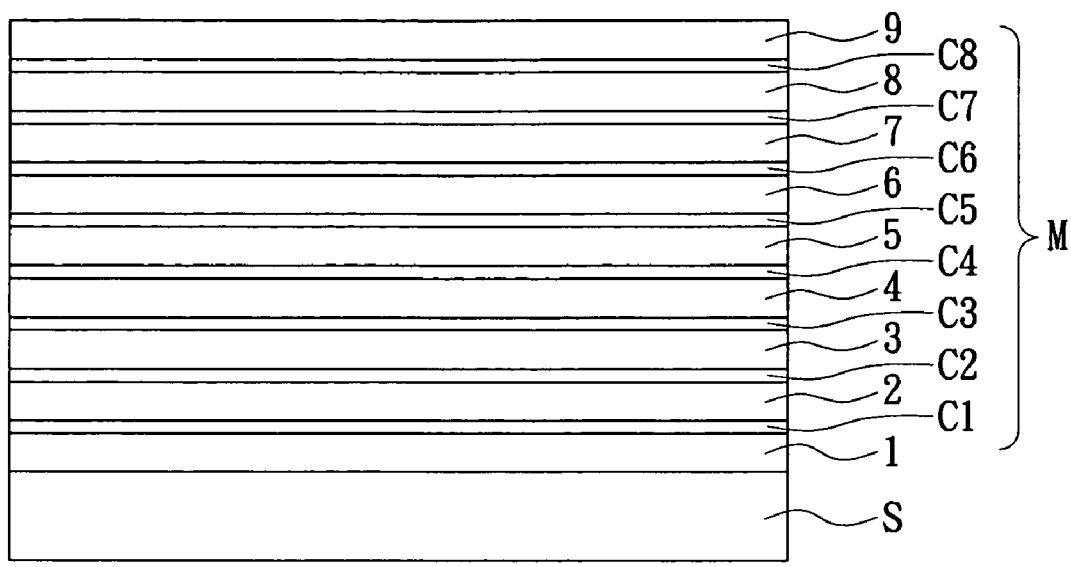
FIG. 2 is a front, schematic view of an extreme low resistivity light attenuation anti-reflection coating structure in order to increase transmittance of blue light according to the present invention.

Referring to FIG. 2, the present invention provides an extreme low resistivity light attenuation anti-reflection coating structure in order to increase transmittance of blue light. The coating structure includes a substrate S and a coating module M.

The substrate S can be a plastic film or a glass. The coating module M can be a basic coating for a plasma display or a liquid crystal display.

Moreover, the coating module M includes a first coating layer 1 formed on a front surface of the substrate S, a first color conversion coating layer C1 formed on the first coating layer 1, a second coating layer 2 formed on the first color conversion coating layer C1, a second color conversion coating layer C2 formed on the second coating layer 2, a third coating layer 3 formed on the second color conversion coating layer C2, a third color conversion coating layer C3 formed on the third coating layer 3, a fourth coating layer 4 formed on the third color conversion coating layer C3, a fourth color conversion coating layer C4 formed on the fourth coating layer 4, a fifth coating layer 5 formed on the fourth color conversion coating layer C4, a fifth color conversion coating layer C5 formed on the fifth coating layer 5, a sixth coating layer 6 formed on the fifth color conversion coating layer C5, a sixth color conversion coating layer C6 formed on the sixth coating layer 6, a seventh coating layer 7 formed on the sixth color conversion coating layer C6, a seventh color conversion coating layer C7 formed on the seventh coating layer 7, an eighth coating layer 8 formed on the seventh color conversion coating layer C7, an eighth color conversion coating layer C8 formed on the eighth coating layer 8, and a ninth coating layer 9 formed on the eighth color conversion coating layer C8.

Furthermore, the first coating layer 1, the third coating layer 3, the fifth coating layer 5, the seventh coating layer 7 and the ninth coating layer 9 are silicon carbide compound coating layers. The first color conversion coating layer C1, the second color conversion coating layer C2, the third color conversion coating layer C3, the fourth color conversion coating layer C4, the fifth color conversion coating layer C5, the sixth color conversion coating layer C6, the seventh color conversion coating layer C7 and the eighth color conversion coating layer C8 are Al-based oxide coating layers. The second coating layer 2, the fourth coating layer 4, the sixth coating layer 6 and the eighth coating layer 8 are metal coating layers.

Hence, the coating module M is formed on the front surface of the substrate S and is composed of a plurality of silicon carbide compound coating layers, a plurality of Al-based oxide coating layers and a plurality of metal coating layers that are alternately stacked onto each other. Each silicon carbide compound coating layer is SiC, each Al-based oxide coating layer is $Al_2O_3$, and each metal coating layer is Ag (silver). The refractive index of each silicon carbide compound coating layer is larger than the refractive index of each metal coating layer.

Moreover, the refractive indices of the first coating layer 1, the third coating layer 3, the fifth coating layer 5, the seventh coating layer 7 and the ninth coating layer 9 are 2.6. The refractive indices of the second coating layer 2, the fourth coating layer 4, the sixth coating layer 6 and the eighth coating layer 8 are between 0.1 and 0.5. Furthermore, the thickness of the first coating layer 1 is 30 nm, the thickness of the second coating layer 2 is between 10~18 nm, the thickness of the third coating layer 3 is 66 nm, the thickness of the fourth coating layer 4 is between 10~18 nm, the thickness of the fifth coating layer 5 is 60 nm, the thickness of the sixth coating layer 6 is between 10~18 nm, the thickness of the seventh coating layer 7 is 70 nm, the thickness of the eighth coating layer 8 is between 10~18 nm and the thickness of the ninth coating layer 9 is 40 nm. In addition, the thickness of the first color conversion coating layer C1, the second color conversion coating layer C2, the third color conversion coating layer C3, the fourth color conversion coating layer C4, the fifth color conversion coating layer C5, the sixth color conversion coating layer C6, the seventh color conversion coating layer C7 and the eighth color conversion coating layer C8 are between 3 nm and 6 nm.

In addition, the first coating layer 1, the third coating layer 3, the fifth coating layer 5, the seventh coating layer 7 and the ninth coating layer 9 (the silicon carbide compound coating layers) are formed by a DC or AC magnetron sputtering method or election Beam Evaporation process. The second coating layer 2, the fourth coating layer 4, the sixth coating layer 6, and the eighth coating layer 8 (the metal coating layers) are formed by a DC or AC magnetron sputtering method or election Beam Evaporation process. Moreover, all of the coating layers (from the first coating layer 1 to the ninth coating layer 9) are formed by an in-line or roll-to-roll vacuum sputtering method.

Figure 3:
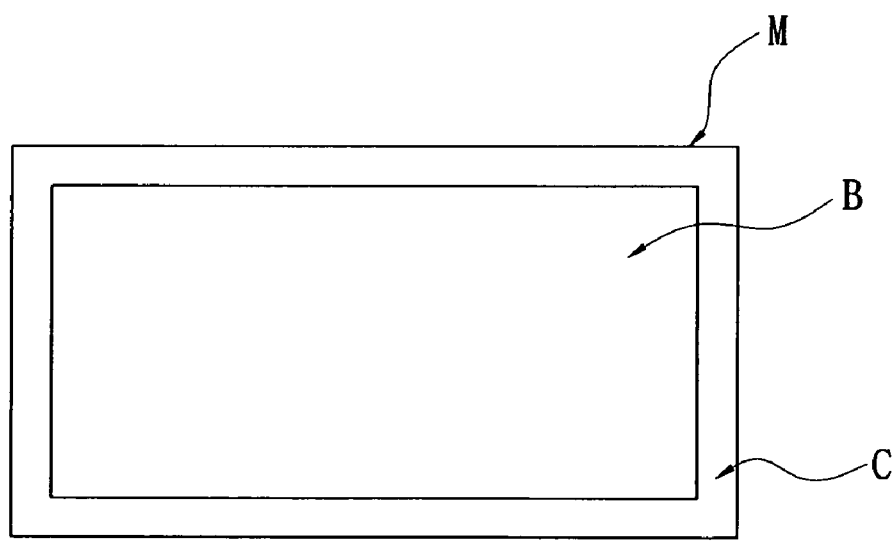
FIG. 3 is a top, schematic view of an extreme low resistivity light attenuation anti-reflection coating structure in order to increase transmittance of blue light according to the present invention.

Referring to FIG. 3, the extreme low resistivity light attenuation anti-reflection coating structure of the present invention further includes a conductive layer C formed on a surrounding area of a top surface of the coating module M for connecting to a ground. Therefore, the conductive layer C is formed on a surrounding area of a top surface of the ninth coating layer 9 of the coating module M for connecting to the ground. In other words, after the coating module M is formed on the substrate S, a shutter B is arranged on the top surface of the coating module M. The shutter B has a size smaller than that of the coating module M in order to expose a surrounding area of the top surface of the coating module M. Afterward a conductive layer C is coated on the surrounding area of the top surface of the coating module M in order to connect to the ground and achieve good electrical contact. Finally, the shutter B is removed. In addition, the conductive layer C can be a silver paste.

Figure 4A:
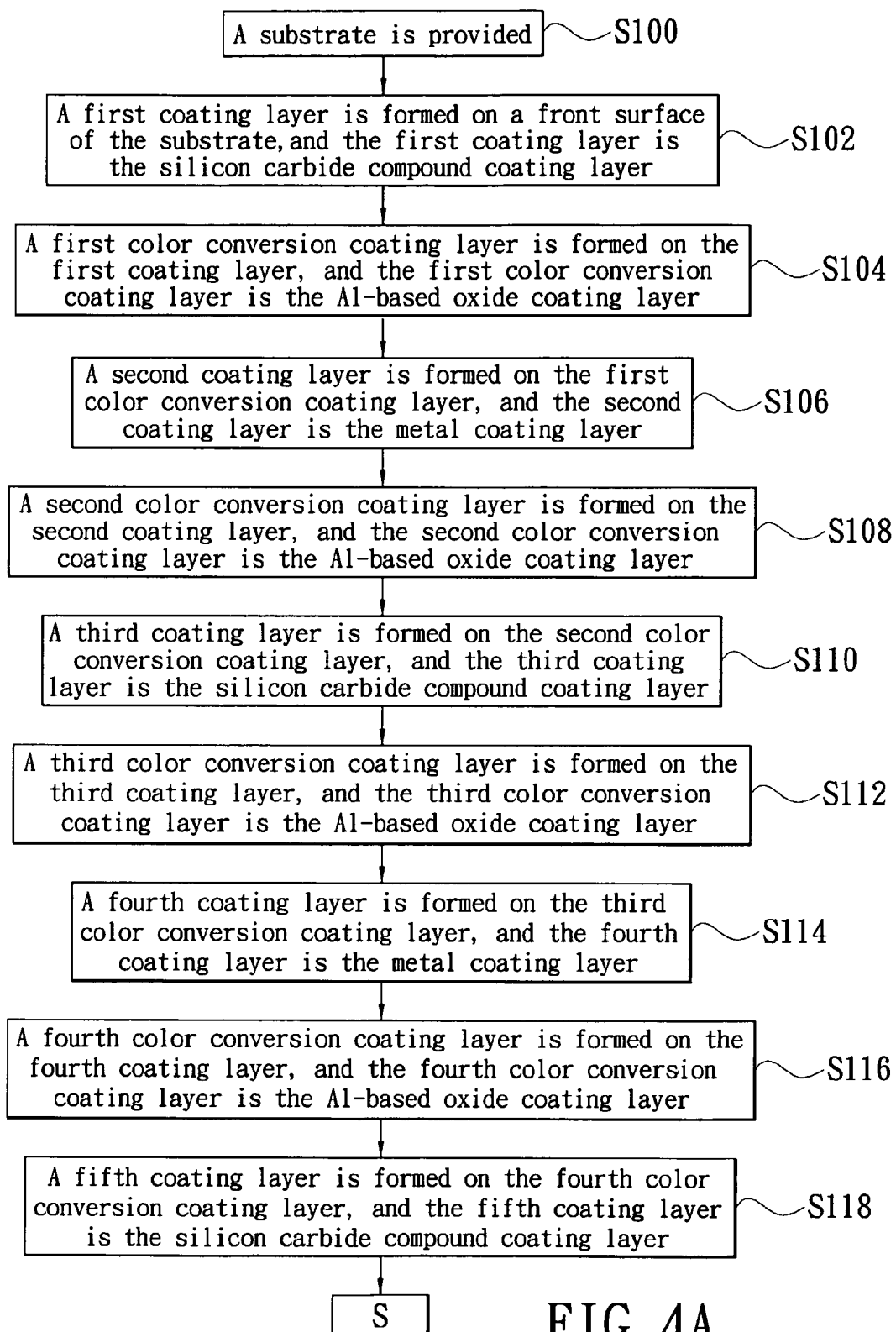
FIGS. 4A and 4B are a flow chart of a method for manufacturing an extreme low resistivity light attenuation anti-reflection coating structure in order to increase transmittance of blue light according to the present invention.
Figure 4B:
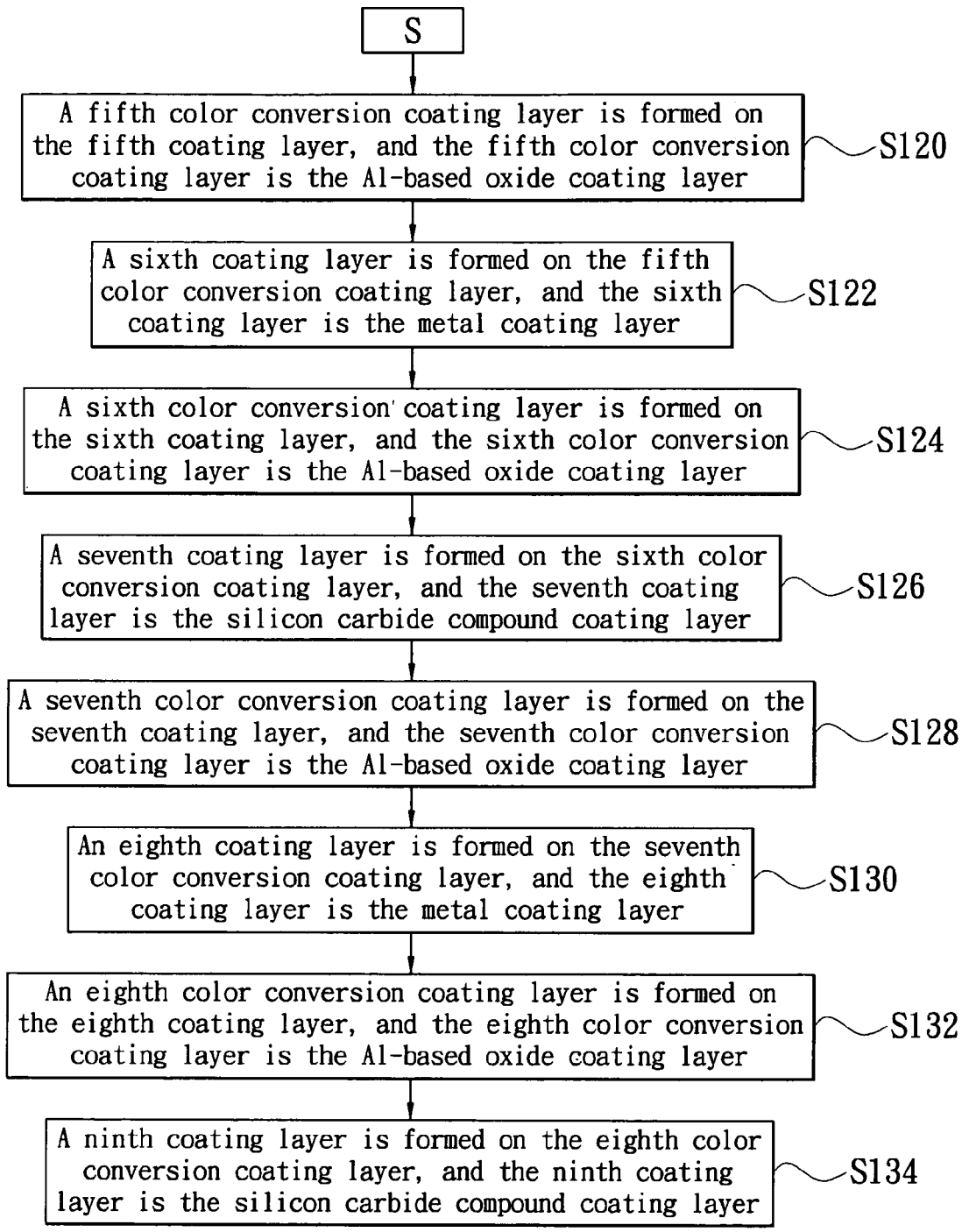

Referring to FIGS. 4A and 4B, the present invention provides a method for manufacturing an extreme low resistivity light attenuation anti-reflection coating structure in order to increase transmittance of blue light. The method includes:

S100: a substrate S is provided;

S102: a first coating layer 1 is formed on a front surface of the substrate S, and the first coating layer 1 is the silicon carbide compound coating layer;

S104: a first color conversion coating layer C1 is formed on the first coating layer 1, and the first color conversion coating layer C1 is the Al-based oxide coating layer;

S106: a second coating layer 2 is formed on the first color conversion coating layer C1, and the second coating layer 2 is the metal coating layer;

S108: a second color conversion coating layer C2 is formed on the second coating layer 2, and the second color conversion coating layer C2 is the Al-based oxide coating layer;

S110: a third coating layer 3 is formed on the second color conversion coating layer C2, and the third coating layer 3 is the silicon carbide compound coating layer;

S112: a third color conversion coating layer C3 is formed on the third coating layer 3, and the third color conversion coating layer C3 is the Al-based oxide coating layer;

S114: a fourth coating layer 4 is formed on the third color conversion coating layer C3, and the fourth coating layer 4 is the metal coating layer;

S116: a fourth color conversion coating layer C4 is formed on the fourth coating layer 4, and the fourth color conversion coating layer C4 is the Al-based oxide coating layer;

S118: a fifth coating layer 5 is formed on the fourth color conversion coating layer C4, and the fifth coating layer 5 is the silicon carbide compound coating layer;

S120: a fifth color conversion coating layer C5 is formed on the fifth coating layer 5, and the fifth color conversion coating layer C5 is the Al-based oxide coating layer;

S122: a sixth coating layer 6 is formed on the fifth color conversion coating layer C5, and the sixth coating layer 6 is the metal coating layer;

S124: a sixth color conversion coating layer C6 is formed on the sixth coating layer 6, and the sixth color conversion coating layer C6 is the Al-based oxide coating layer;

S126: a seventh coating layer 7 is formed on the sixth color conversion coating layer C6, and the seventh coating layer 7 is the silicon carbide compound coating layer;

S128: a seventh color conversion coating layer C7 is formed on the seventh coating layer 7, and the seventh color conversion coating layer C7 is the Al-based oxide coating layer;

S130: an eighth coating layer 8 is formed on the seventh color conversion coating layer C7, and the eighth coating layer 8 is the metal coating layer;

S132: an eighth color conversion coating layer C8 is formed on the eighth coating layer 8, and the eighth color conversion coating layer C8 is the Al-based oxide coating layer; and S134: a ninth coating layer 9 is formed on the eighth color conversion coating layer C8, and the ninth coating layer 9 is the silicon carbide compound coating layer.

Figure 5:
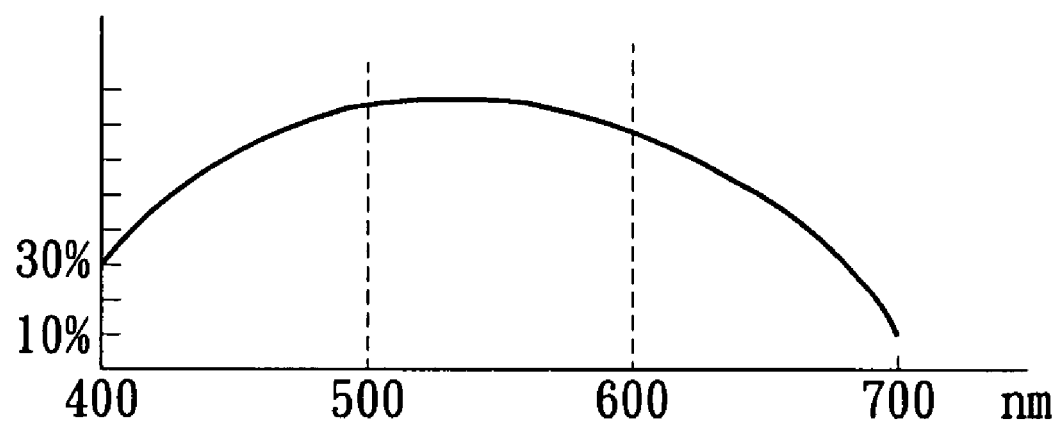
FIG. 5 is a property diagram showing the relationship between the transmittance of the extreme low resistivity light attenuation anti-reflection coating structure of the present invention and the light wavelength.

FIG. 5 shows a property diagram showing the relationship between the transmittance of the extreme low resistivity light attenuation anti-reflection coating structure of the present invention and the light wavelength. When light passes through the extreme low resistivity light attenuation anti-reflection coating structure, the transmittances of different wavelength are different. In particular, the transmittance of the wavelength close to blue (left-most area) is increased from about 10% to about 30%.

Figure 6:
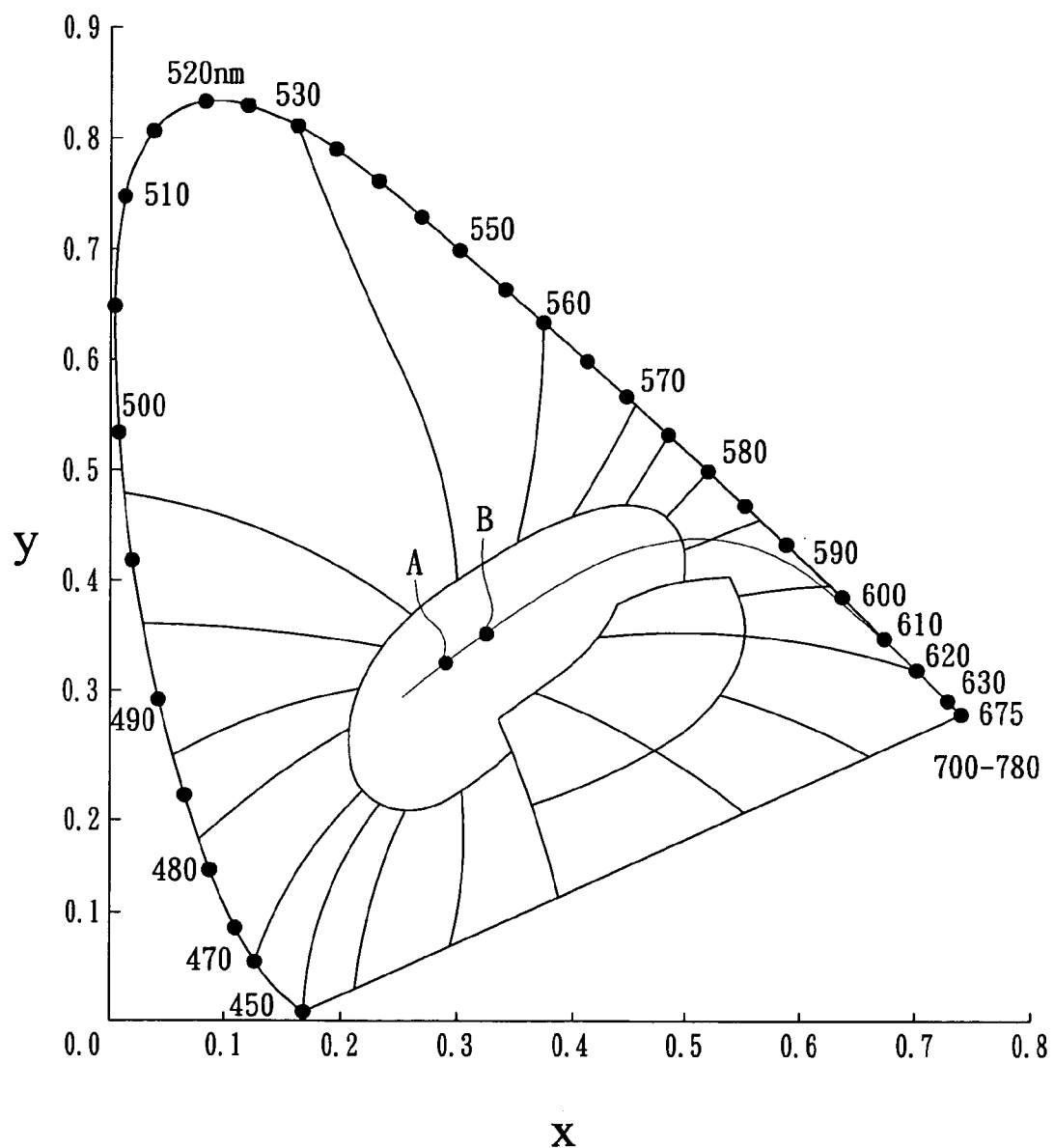
FIG. 6 is a CIE xy chromaticity diagram of extreme low resistivity light attenuation anti-reflection coating structure in order to increase transmittance of blue light according to the present invention.

FIG. 6 shows a CIE xy chromaticity diagram of extreme low resistivity light attenuation anti-reflection coating structure in order to increase transmittance of blue light according to the present invention. Because $Al_2O_3$ is added into the present invention during sputtering process, the xy chromaticity coordinates is changed from point A (0.32~0.33, 0.35~0.36) to point B (0.28~0.30, 0.32~0.34). Therefore, the color of the xy chromaticity coordinates is changed from yellow green close to blue.

In conclusion, the process of manufacturing the extreme low resistivity light attenuation anti-reflection coating structure in high volume production is highly reliable and has been routinely used in industries such as semiconductor manufacturing, disc head manufacturing, LCD manufacturing, CRT manufacturing, architecture glass manufacturing, touch sensor display manufacturing, screen filter manufacturing and plastic web coating for more than twenty years.

Moreover, material of the surface layer of the extreme low resistivity light attenuation anti-reflection coating is a high refractive index protective layer. The reflectivity of the extreme low resistivity light attenuation anti-reflection coating is below 0.5%. The resistivity of the anti-reflection coating is as low as 0.5 Ωm to 0.7 Ωm, and its transparency is between 40% and 65%.

Furthermore, the layer system of the present invention is also highly conductive for EMI (Electromagnetic Interference) shielding, has low reflectivity for optical viewing, is highly scratch resistance for surface hardness, and has moderate light attenuation effects for manufacturing PDP displays. For instance, the layer system has a surface resistance of between 0.5 Ωm and 0.7 Ωm and is hard enough to pass the scratch test of military standard MIL-C-48497.

Because of the design of shutter and mask the surrounding area of the surface layer has good electrical conductive properties, the surface contact area layer reduces much of the work in the grounding process and also increases the total yield and reliability in high volume production. The present invention provides a surface contact conductive area structure with an anti-reflection coating that can be applied to the LCD and PDP display industries for glass and plastic film substrates.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A light attenuation anti-reflection coating structure in order to increase transmittance of blue light, comprising:
    a substrate;
    a coating module formed on a front surface of the substrate and composed of a plurality of silicon carbide compound coating layers, a plurality of Al-based oxide coating layers and a plurality of metal coating layers that are alternately stacked onto each other; and
    a conductive layer formed on a surrounding area of a top surface of the coating module for connecting to a reference potential.

2. The light attenuation anti-reflection coating structure as claimed in claim 1, wherein the substrate is a plastic film.

3. The light attenuation anti-reflection coating structure as claimed in claim 1, wherein the substrate is a glass.

4. The light attenuation anti-reflection coating structure as claimed in claim 1, wherein the coating module is a basic coating for a plasma display or a liquid crystal display.

5. The light attenuation anti-reflection coating structure as claimed in claim 1, wherein the coating module comprises:
    a first coating layer formed on the front surface of the substrate;
    a first color conversion coating layer formed on the first coating layer;
    a second coating layer formed on the first color conversion coating layer;
    a second color conversion coating layer formed on the second coating layer;
    a third coating layer formed on the second color conversion coating layer;
    a third color conversion coating layer formed on the third coating layer;
    a fourth coating layer formed on the third color conversion coating layer;
    a fourth color conversion coating layer formed on the fourth coating layer;
    a fifth coating layer formed on the fourth color conversion coating layer;
    a fifth color conversion coating layer formed on the fifth coating layer;
    a sixth coating layer formed on the fifth color conversion coating layer;
    a sixth color conversion coating layer formed on the sixth coating layer;
    a seventh coating layer formed on the sixth color conversion coating layer;
    a seventh color conversion coating layer formed on the seventh coating layer;
    an eighth coating layer formed on the seventh color conversion coating layer;
    an eighth color conversion coating layer formed on the eighth coating layer; and
    a ninth coating layer formed on the eighth color conversion coating layer;
    wherein the first coating layer, the third coating layer, the fifth coating layer, the seventh coating layer and the ninth coating layer are the silicon carbide compound coating layers;
    wherein the first color conversion coating layer, the second color conversion coating layer, the third color conversion coating layer, the fourth color conversion coating layer, the fifth color conversion coating layer, the sixth color conversion coating layer, the seventh color conversion coating layer and the eighth color conversion coating layer are the Al-based oxide coating layers;
    wherein the second coating layer, the fourth coating layer, the sixth coating layer and the eighth coating layer are the metal coating layers.

6. The light attenuation anti-reflection coating structure as claimed in claim 5, wherein each silicon carbide compound coating layer is SiC, each Al-based oxide coating layer is $Al_2O_3$, and each metal coating layer is Ag (silver).

7. The light attenuation anti-reflection coating structure as claimed in claim 5, wherein the refractive index of each silicon carbide compound coating layer is larger than the refractive index of each metal coating layer.

8. The light attenuation anti-reflection coating structure as claimed in claim 5, wherein the refractive indices of the first coating layer, the third coating layer, the fifth coating layer, the seventh coating layer and the ninth coating layer are 2.6, and the refractive indices of the second coating layer, the fourth coating layer, the sixth coating layer and the eighth coating layer are between 0.1 and 0.5.

9. The light attenuation anti-reflection coating structure as claimed in claim 5, wherein the thickness of the first coating layer is 30 nm, the thickness of the second coating layer is between 10~18 nm, the thickness of the third coating layer is 66 nm, the thickness of the fourth coating layer is between 10~18 nm, the thickness of the fifth coating layer is 60 nm, the thickness of the sixth coating layer is between 10~18 nm, the thickness of the seventh coating layer is 70 nm, the thickness of the eighth coating layer is between 10~18 nm, the thickness of the ninth coating layer is 40 nm, and the thickness of the first color conversion coating layer, the second color conversion coating layer, the third color conversion coating layer, the fourth color conversion coating layer, the fifth color conversion coating layer, the sixth color conversion coating layer, the seventh color conversion coating layer and the eighth color conversion coating layer are between 3 nm and 6 nm.

10. A method for manufacturing light attenuation anti-reflection coating structure in order to increase transmittance of blue light, comprising:
    providing a substrate;
    forming a coating module on a front surface of the substrate, wherein the coating module is composed of a plurality of silicon carbide compound coating layers, a plurality of Al-based oxide coating layers and a plurality of metal coating layers that are alternately stacked onto each other;
    arranging a shutter on a top surface of the coating module, wherein the shutter has a size smaller than that of the coating module for exposing a surrounding area of the top surface of the coating module; and coating a conductive layer on the surrounding area of the top surface of the coating module for connecting to a reference potential.

11. The method as claimed in claim 10, wherein the substrate is a plastic film.

12. The method as claimed in claim 10, wherein the substrate is a glass.

13. The method as claimed in claim 10, wherein the coating module is a basic coating for a plasma display or a liquid crystal display.

14. The method as claimed in claim 10, wherein the step of forming the coating module further comprises:
    forming a first coating layer on the front surface of the substrate;
    forming a first color conversion coating layer on the first coating layer;
    forming a second coating layer on the first color conversion coating layer;
    forming a second color conversion coating layer on the second coating layer;
    forming a third coating layer on the second color conversion coating layer;
    forming a third color conversion coating layer on the third coating layer;
    forming a fourth coating layer on the third color conversion coating layer;
    forming a fourth color conversion coating layer on the fourth coating layer;
    forming a fifth coating layer on the fourth color conversion coating layer;
    forming a fifth color conversion coating layer on the fifth coating layer;
    forming a sixth coating layer on the fifth color conversion coating layer;
    forming a sixth color conversion coating layer on the sixth coating layer;
    forming a seventh coating layer on the sixth color conversion coating layer;
    forming a seventh color conversion coating layer on the seventh coating layer;
    forming an eighth coating layer on the seventh color conversion coating layer;
    forming an eighth color conversion coating layer on the eighth coating layer; and
    forming a ninth coating layer on the eighth color conversion coating layer;
    wherein the first coating layer, the third coating layer, the fifth coating layer, the seventh coating layer and the ninth coating layer are the silicon carbide compound coating layers;
    wherein the first color conversion coating layer, the second color conversion coating layer, the third color conversion coating layer, the fourth color conversion coating layer, the fifth color conversion coating layer, the sixth color conversion coating layer, the seventh color conversion coating layer and the eighth color conversion coating layer are the Al-based oxide coating layers;
    wherein the second coating layer, the fourth coating layer, the sixth coating layer and the eighth coating layer are the metal coating layers.

15. The method as claimed in claim 14, wherein each silicon carbide compound coating layer is SiC, each Al-based oxide coating layer is $Al_2O_3$, and each metal coating layer is Ag (silver).

16. The method as claimed in claim 14, wherein the refractive index of each silicon carbide compound coating layer is larger than the refractive index of each metal coating layer.

17. The method as claimed in claim 14, wherein the refractive indices of the first coating layer, the third coating layer, the fifth coating layer, the seventh coating layer and the ninth coating layer are 2.6, and the refractive indices of the second coating layer, the fourth coating layer, the sixth coating layer and the eighth coating layer are between 0.1 and 0.5.

18. The method as claimed in claim 14, wherein the thickness of the first coating layer is 30 nm, the thickness of the second coating layer is between 10~18 nm, the thickness of the third coating layer is 66 nm, the thickness of the fourth coating layer is between 10~18 nm, the thickness of the fifth coating layer is 60 nm, the thickness of the sixth coating layer is between 10~18 nm, the thickness of the seventh coating layer is 70 nm, the thickness of the eighth coating layer is between 10~18 nm, the thickness of the ninth coating layer is 40 nm, and the thickness of the first color conversion coating layer, the second color conversion coating layer, the third color conversion coating layer, the fourth color conversion coating layer, the fifth color conversion coating layer, the sixth color conversion coating layer, the seventh color conversion coating layer and the eighth color conversion coating layer are between 3 nm and 6 nm.

* * * * *